United States Patent Office 2,734,816
Patented Feb. 14, 1956

2,734,816
PLANT REGULATORS

John W. Wood, Silver Spring, Md., Thomas D. Fontaine, Abington, Pa., and John W. Mitchell, Silver Spring, Md., assignors to the United States of America as represented by the Secretary of Agriculture No Drawing. Application April 15, 1953,
Serial No. 349,113

13 Claims. (Cl. 71—2.6)

(Granted under Title 35, U. S. Code (1952), sec. 266)

A non-exclusive, irrevocable, royalty-free license in the invention herein described for all governmental purposes, throughout the world, with power to grant sublicenses for such purposes, is hereby granted to the Government of the United States of America.

This invention relates to plant regulators (sometimes referred to as growth regulators, growth substances, hormones) and in particular to those of the carboxylic acid type. More specifically, it relates to N-substituted amides of such acids wherein the amido nitrogen is that of an optically active amino acid. Such compounds may be represented by the formula

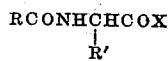

where RCO— is the acyl radical of a known plant-growth regulator of the carboxylic acid type,

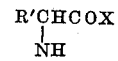

is the radical of an amino acid or an amide or ester thereof containing at least one asymmetric carbon atom, and X is a hydroxy, alkoxy, or amido group.

Plant regulators of the carboxylic acid type include indoleacetic acid, phenoxyacetic acid, naphthalenacetic acid, naphthoxyacetic acid and nuclear halogenated derivatives of such acids.

In general, the simple salts, esters, and amides of these acids produce effects on plants similar to those of the free acids.

While the mechanism of the action of such growth regulators is not understood fully, it is believed that the free acid is the active agent and that the affected plants are able to convert the salts, esters or amides to the free acid. This implies that the plants possess enzyme systems capable of splitting these compounds.

Most of the optically active amino acids formed in nature are of the L-configuration. It frequently happens that enzyme systems, being highly specific in their activity, are capable of reacting with only one optical isomer of a compound, the "natural" L-form. Other enzyme sys-

TABLE I

*Physical and analytical data of halo-phenoxyacetylated amino acids*

| | | Analyses | | |
|---|---|---|---|---|
| | M. P., ° C. Corr. | Chlorine | Nitrogen | $\alpha_D$ |
| Nα-(2,4-Dichlorophenoxacetyl): | | | | |
| D-alanine | 203.7–204.7 | 24.24 | 4.84 | −12.8° (27° C.) |
| L-alanine | 197.2–199.2 | 24.41 | 4.84 | +11.4° (20° C.) |
| DL-alanine | 212.8–213.8 | 24.21 | 4.78 | |
| D-asparagine | 183.3–184.3 | 21.24 | 8.14 | −18.5° (27° C.) |
| L-asparagine | 186.4–187.4 | 21.14 | 8.24 | +17.4° (27° C.) |
| DL-asparagine | 180.2–181.3 | 21.12 | 7.93 | |
| D-aspartic acid | 200.8–201.8 | 20.87 | 4.18 | −20.0° (20° C.) |
| L-aspartic acid | 201.8–202.6 | 20.81 | 4.18 | +19.9° (20° C.) |
| DL-aspartic acid | 217.0–217.5 | 21.10 | 4.18 | |
| L-glutamic acid | 178.2–179.2 | 20.24 | 3.92 | +14.1° (20° C.) |
| DL-glutamic acid | 191.5–192.5 | 20.33 | 3.92 | |
| DL-histidine, methyl ester, Hcl. | 128.6–129.7 | 25.33 | 10.43 | |
| D-isoleucine | 143.9–145.1 | 21.19 | 4.22 | −10.1 (27° C.) |
| L-isoleucine | 143.4–143.9 | 21.23 | 4.21 | +10.0 (28° C.) |
| DL-isoleucine | 142.0–143.4 | 21.58 | 4.20 | |
| D-leucine | 155.7–156.7 | 21.14 | 4.21 | +16 (26° C.) |
| L-leucine | 149.9–150.4 | 21.27 | 4.22 | −17.4 (20° C.) |
| DL-leucine | 137.0–138.0 | 21.26 | 4.19 | |
| D-methionine | 129.7–131.8 | 20.31 | 3.77 | +1.1° (20° C.) |
| L-methionine | 133.8–134.8 | 20.22 | 3.75 | −1.2° (20° C.) |
| DL-methionine | 143.9–145.1 | 20.11 | 3.90 | |
| D-phenylalanine | 154.6–155.7 | 19.31 | 3.84 | +7.4° (20° C.) |
| L-phenylalanine | 178.2–179.2 | 19.13 | 3.75 | −7.7° (20° C.) |
| DL-phenylalanine | 179.2–180.2 | 19.18 | | |
| L-proline | 104.8–106.3 | 22.22 | 4.40 | −62.4° (20° C.) |
| DL-proline | 143.9–145.1 | 22.15 | 4.40 | |
| D-serine | 171.8–172.8 | 22.38 | 4.67 | −25.3° (26° C.) |
| DL-serine | 192–195 | 23.00 | 4.50 | |
| D-threonine | 131.0–132.0 | 21.92 | 4.32 | −13.1 (26° C.) |
| DL-threonine | 137.9–139.0 | 21.77 | 4.33 | |
| D-tryptophan | 177.2–178.2 | 17.41 | 6.86 | +13.0 (28° C.) |
| L-tryptophan | 152.2–153.4 (1st) | | | |
| | 177.2–178.2 (2nd) | 17.32 | 6.88 | −13.0 (27° C.) |
| DL-tryptophan | 147.0–147.9 | 17.45 | 6.70 | |
| D-valine | 164.2–164.7 | 22.15 | 4.39 | −14.3 (26° C.) |
| L-valine | 164.2–164.7 | 22.14 | 4.40 | +13.8 (25° C.) |
| DL-valine | 159.3–159.9 | 22.27 | 4.40 | |
| N,N'-bis-(2,4-Dichlorophenoxyacetyl)-: | | | | |
| L-cystine | 215–216 | 21.50 | 4.39 | −14.2° (20° C.) |
| Nα,Nε-bis-(2,4-Dichlorophenoxyacetyl)-: | | | | |
| L-lysine | Not crystallized | 25.99 | 4.67 | −6.0 (20° C.) |
| DL-lysine | 175.0–176.1 | 25.56 | 5.04 | |
| N,O-bis-(2,4-Dichlorophenoxyacetyl)-: | | | | |
| DL-tyrosine Methyl ester | 119.7–121.6 | 23.49 | 2.37 | |
| Nα-(2,4,5-Trichlorophenoxyacetyl)-: | | | | |
| DL-valine | 194.6–195.6 | 29.88 | 3.95 | |
| D-asparagine | 207.8–208.8 | 28.71 | 7.19 | −2.1 (25° C.) |
| L-asparagine | 205.7–206.7 | 28.61 | 7.21 | +2.1 (25° C.) | tems react differently or at a different rate with the two optical isomers.

An object of this invention is to provide novel plant regulators; another object is to provide plant regulators capable of inducing beneficial responses without injury to the plant, as an example, the production of heavier fruit set, larger fruit and parthenocarpic fruit on tomato and other plants without producing formative effects on the plants themselves. Still another object is to provide a unique type of optically active plant regulators useful in the study of plant physiology.

We have now discovered that optically active amino acid derivatives of known plant regulators have growth modifying properties that are dependent on the optical activity of the compound. Thus, optically active amino acids or their esters, amides or salts being readily available, are acylated with known plant regulators of the carboxylic acid type to yield optically active N-substituted amides of the acid plant regulator.

We have discovered that such amides derived from L or the D, L-mixtures of amino acids have growth modifying properties rather similar to those of the free regulator acid and produce characteristic formative effects on susceptible plants when applied in concentrations of 4 p. p. m. or more. In marked contrast, similar amides made from the "unnatural" D-amino acids do not produce formative changes when applied at the same or somewhat higher concentrations. They produced other valuable effects such as heavier fruit set, larger fruit and parthenocarpic fruit on tomato plants grown under greenhouse conditions. This radical difference in hormonal activity indicates that the plant enzyme systems are unable to cleave the D-amides, or that the cleavage is produced in a different way.

Our novel amides can be prepared by any known method, the most convenient one being the following:
1. The known plant regulator acid is converted to the acid chloride by treatment with thionyl chloride.
2. The optically active amino acid, in the form of an ester, amide, or metallic salt, treated with the acid chloride in the presence of excess alkali. These preparative steps are conventional and are more fully described in our publication in J. Org. Chem. 17, 891 (1952).

Table I shows some of the compounds illustrating our invention. All of them are derivatives of optically active amino acids, i. e., they contain at least one asymmetric carbon atom. Glycine, a naturally occurring amino acid, does not contain an asymmetric carbon atom; hence it cannot show optical activity and is not included in the scope of our invention.

We have tested all of the compounds listed in Table I for plant hormone activity by treating plants, as for example, greenhouse tomatoes, in the regular, well known manner of applying plant growth regulators.

The D, L-compounds showed formative effects at 4 to 30 p. p. m. The L-isomers showed similar but stronger effects. The D-isomers failed to produce formative effects at these concentrations but produced other beneficial effects such as stimulating the production of fruit in increased number and size and of parthenocarpic fruit.

We claim:
1. A derivative of a D-amino acid wherein the amino acid has been acylated with a nuclearly chlorinated phenoxyacetic acid.
2. The derivative of claim 1 wherein the nuclearly chlorinated phenoxyacetic acid is 2,4-dichlorophenoxyacetic acid.
3. The derivative of claim 1 wherein the nuclearly chlorinated phenoxyacetic acid is 4-chlorophenoxyacetic acid.
4. The derivative of claim 1 wherein the nuclearly chlorinated phenoxyacetic acid is 2,4,5-trichlorophenoxyacetic acid.
5. The derivative of claim 1 wherein the amino acid is the D-isomer of a naturally occurring amino acid.
6. The derivative of claim 1 wherein the amino acid is D-alanine and the nuclearly chlorinated phenoxyacetic acid is 2,4-dichlorophenoxyacetic acid.
7. The derivative of claim 1 wherein the amino acid is D-aspartic acid and the nuclearly chlorinated phenoxyacetic acid is 2,4-dichlorophenoxyacetic acid.
8. The derivative of claim 1 wherein the amino acid is D-cystine and the nuclearly chlorinated phenoxyacetic acid is 2,4-dichlorophenoxyacetic acid.
9. The derivative of claim 1 wherein the amino acid is D-tyrosine and the nuclearly chlorinated phenoxyacetic acid is 2,4-dichlorophenoxyacetic acid.
10. The derivative of claim 1 wherein the amino acid is D-valine and the nuclearly chlorinated phenoxyacetic acid is 2,4,5-trichlorophenoxyacetic acid.
11. A process of regulating the growth of a plant comprising treating the plant with a derivative of a D-amino acid wherein the amino acid has been acylated with a nuclearly chlorinated phenoxyacetic acid.
12. A process of regulating the growth of a plant comprising treating the plant with a derivative of the D-isomer of a naturally occurring amino acid wherein the amino acid has been acylated with a nuclearly chlorinated phenoxyacetic acid.
13. A process of regulating the growth of a plant comprising treating the plant with N-(2,4-dichlorophenoxyacetyl)-D-aspartic acid.

References Cited in the file of this patent

UNITED STATES PATENTS

| | | |
|---|---|---|
| 2,287,102 | Isler | June 23, 1942 |
| 2,481,597 | Johnson | Sept. 13, 1949 |

OTHER REFERENCES

Weygand et al.: Chem. Ab. 46, 19, 195 (1952).
Journal of the American Chemical Society, vol. 70 (1948), pages 2849 to 2851.